UNITED STATES PATENT OFFICE.

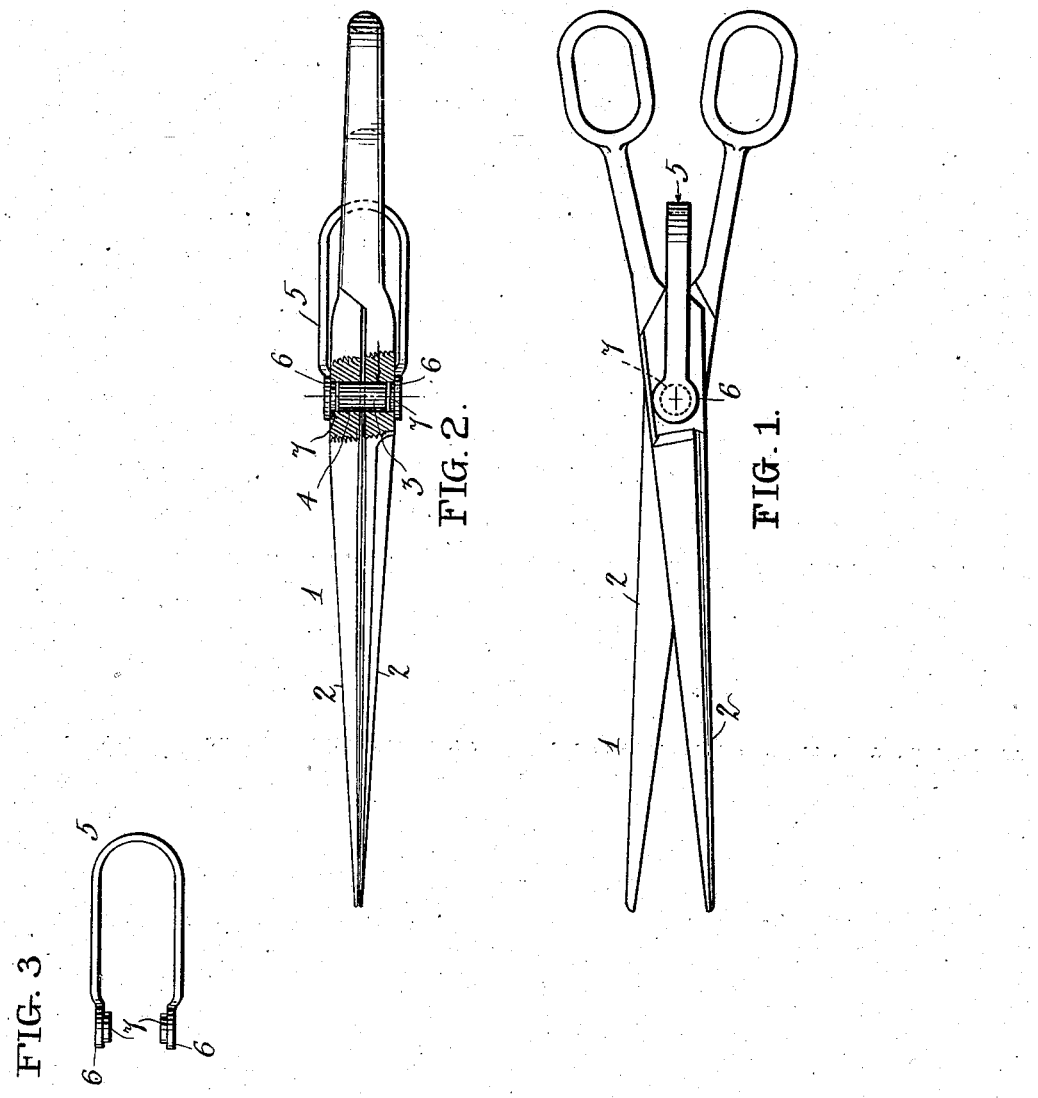

CHARLES B. KLEIN, OF DENVER, COLORADO.

SHEARS.

No. 854,952.  Specification of Letters Patent.  Patented May 28, 1907.

Application filed May 31, 1906. Serial No. 319,629.

*To all whom it may concern:*

Be it known that I, CHARLES B. KLEIN, a citizen of the United States, residing at Denver, in the county of Denver and State of Colorado, have invented certain new and useful Improvements in Shears; and I do declare the following to be a full, clear, and exact description of the invention, such as will enable others skilled in the art to which it appertains to make and use the same.

This invention relates to improvements in shears.

The object of the invention is to provide means whereby the blades of a pair of shears may be yieldingly held together upon their pivot, so that the cutting edges of the blades will always be in correct working position, and held in frictional engagement when in use, which will cause the same to be self sharpening.

With the above and other objects in view, the invention consists of certain novel features of construction, combination and arrangement of parts, as will be hereinafter described and claimed.

In the accompanying drawings:—Figure 1 is a side elevation of a pair of shears, showing the application of the invention thereto; Fig. 2 is an edge view of the same, parts being broken away; Fig. 3 is a detail plan view of the holding spring removed from the shears.

Referring more particularly to the drawings, 1 denotes a pair of shears, the blades 2 of which are pivotally connected by a pivot pin 3, which is inserted in alined apertures 4 provided therefor in the blades 2. The length of the pivot pin 3 is somewhat less than the combined thickness of the two blades of the shears, so that a space or socket is formed by the aperture 4 at each end of the pin, as shown.

Adapted to be engaged with the blades of the shears is a flat metal yoke or bow spring 5, the bowed or looped end of which is disposed between the handle of the shears and the outer ends of which are provided with circular heads 6 that are slightly offset from the sides of the spring, as shown. On the inner sides of the heads 6 are formed inwardly projecting cylindrical studs 7 adapted to be engaged with the recesses or sockets formed by the ends of the apertures 4 adjacent to each end of the pivot pin 3, thereby holding the spring 5 in position on the shears.

By arranging a spring with its ends engaged and connected to the blades as hereinbefore shown and described, the tension of the spring will serve to yieldingly hold the inner edges of the blades in proper working position at all times, and will permit of the yielding or separating of the blades when the edges of the same are brought into engagement with any material which it is not suitable for the shears to cut, thus preventing the bending or breaking of the shear blades. By providing a holding spring for the blades of a pair of shears, the cutting edges of the same will be held in frictional engagement, so that when the shears are used, the action of one blade working upon the other will cause the cutting edges of the same to wear alike, and in so wearing will provide for the self sharpening of said cutting edges. From the construction herein shown and described, it will be obvious that the spring while primarily intended to be used in connection with the manufacture of new shears, the same may be applied to old shears now in use with but slight alteration of the same, and when so applied will cause the blades of the old shears to sharpen themselves after the manner hereinbefore described.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as defined by the appended claims.

Having thus described my invention, what I claim as new and desire to secure by Letters-Patent, is:—

The combination with a pair of shears having a pivot of less length than the combined thickness of the blades to provide a socket at each end of the pivot, of a yoke spring to straddle the shear blades and having its terminals provided with inwardly-projecting studs to engage the said sockets.

In testimony whereof I have hereunto set my hand in presence of two subscribing witnesses.

CHAS. B. KLEIN.

Witnesses:
GEORGE J. HUMBERT,
M. N. SMITH.